July 25, 1967     P. BARKAN ETAL     3,333,189
HYDRAULIC INTEGRATING APPARATUS USING TWO DIFFERENT FLUIDS
Original Filed Jan. 2, 1963
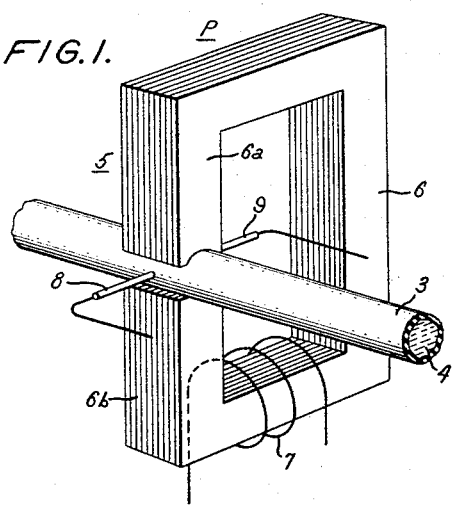
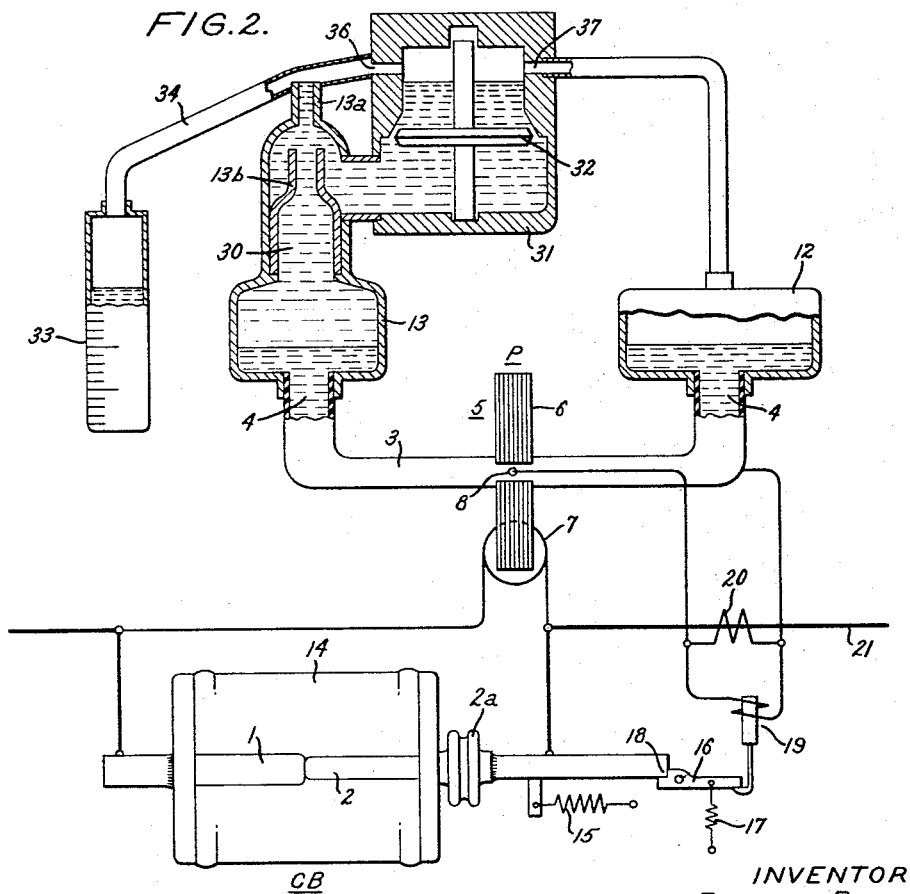
INVENTORS:
PHILIP BARKAN,
THOMAS A. BURNS,
BY
ATTORNEY.

United States Patent Office 3,333,189
Patented July 25, 1967

3,333,189
HYDRAULIC INTEGRATING APPARATUS USING
TWO DIFFERENT FLUIDS
Philip Barkan, Lima, and Thomas A. Burns, Media, Pa., assignors to General Electric Company, a corporation of New York
Continuation of application Ser. No. 248,988, Jan. 2, 1963. This application Nov. 23, 1966, Ser. No. 596,726
6 Claims. (Cl. 324—76)

This application is a continuation of application 248,-988, filed Jan. 2, 1963, now abandoned.

Our invention relates to hydraulic integrating apparatus, and more particularly to devices providing unidirectional volumetric integration of intermittent liquid flow. The invention is especially adapted for use with integrating liquid metal pumps, such as mercury pumps, which are subject to intermittent short-time operation.

It has previously been suggested that a mercury pump designed for intermittent energization may be utilized as an integrating or metering device by preventing reverse flow of mercury and accumulating in a suitable discharge chamber or vessel the total quantity of liquid pumped in a forward direction beyond a predetermined check point in the course of successive operating intervals. Such an arrangement is disclosed for example in application S.N. 219,274, now Patent No. 3,161,822, filed Aug. 24, 1962, by August L. Streater for "Electric Metering Apparatus," and assigned to the same assignee as the instant application. In that application a mercury pump is utilized to measure total arcing current flow over an extended time interval between contacts of a sealed circuit interrupting device. By thus totalizing arcing currents the integrating device gives a practical measure of remaining contact life.

In the integrating device illustrated in the Streater application, the conducting fluid of the pump, which may suitably be mercury, is directly accumulated in an overflow vessel to integrate intermittent flow. In a practical embodiment of a mercury pump there are certain disadvantages to direct accumulation of mercury by any overflow arrangement utilizing a capillary tube such as there illustrated. While mercury serves very well as the conducting fluid in an electromagnetic liquid-level pump, its surface tension is so high that significant error may occur in volume indication. The minimum drop size which can be formed with mercury is rather large. In addition, if a U-shaped overflow tube having legs of different bores is used in the mercury-containing portion of the pump, the high surface tension causes a significant difference in pressure head in the two legs the U even under static conditions. Finally a direct liquid-accumulating system for integrating intermittent flow must preclude reversal of liquid flow. Irreversibility is ordinarily effected by check valves, and such valves do not operate satisfactorily at low pressures in an atmosphere of mercury. This is also a surface tension effect due to failure of the mercury to fill sharp corners and the consequent creation of low pressure voids.

Accordingly it is a general object of our invention to provide a new and improved hydraulic integrating or accumulating apparatus, particularly for use with electromagnetic liquid-metal pumps of the mercury type.

More particularly it is an object of this invention to provide, in an electromagnetic conducting liquid pump, liquid-accumulating means other than the conducting liquid itself for volumetrically integrating intermittent flow of the conducting liquid in one direction.

Still another object of our invention is to provide new and novel means for integrating flow volume in one direction of a body of liquid subject to intermittent undulating motion.

It is a specific object of our invention to provide a resetting type liquid metal pump for intermittent operation having liquid-accumulating means for integrating forward flow of the conducting liquid over an extensive time interval.

In carrying out our invention in one preferred embodiment, we utilize an electromagnetic liquid-metal pump including a conduit connected at one end to a mercury reservoir and at the other end to a discharge chamber. The contained body of mercury is maintained by the reservoir at an initial level only partially filling the discharge chamber. To integrate intermittent forward flow of mercury into the discharge chamber we provide a low surface tension secondary liquid filling the discharge chamber above the surface of the mercury and connected to a supply or make-up reservoir of secondary liquid. The secondary liquid is of very low density and does not mix with the mercury. The discharge chamber is provided at its top with a vertically disposed capillary discharge tube extending above the chamber and communicating with a calibrated accumulating vessel or gauge. During each interval of pump operation a quantity of secondary liquid is discharged through the capillary tube into the gauge and there accumulated to integrate the volume of forward flow over intermittent flow intervals which may be separated by long periods of inactivity. By utilizing a make-up source of secondary liquid supply, the primary driving liquid, i.e., mercury, may be permitted to reset to a predetermined initial level in the discharge chamber after each interval of forward flow. With such back and forth, or undulating, motion of the mercury it is unnecessary to provide any check valve in the mercury system.

Our invention will be better understood and its various objects and advantages further appreciated by referring now to the following detailed description taken in conjunction with the drawing in which:

FIG. 1 is a perspective view of an electromagnetic conducting liquid pump of a type to which our invention is particularly applicable, and FIG. 2 is a diagrammatic representation of an electric arc integrating apparatus for circuit breakers including an electromagnetic mercury pump and secondary liquid flow integrating apparatus embodying our invention.

Referring now to the drawing and particularly to FIG. 1, we have shown a section of conduit 3 containing a conducting liquid 4, such as mercury, and adapted to be connected at one end to a mercury supply reservoir and at the other end to a discharge chamber as will be more fully described hereinafter. At an intermediate point along the length of the conduit 1, there is provided an electromagnetic pump P comprising an electromagnet 5 having a magnetizable core 6 and a field winding 7. The core 6 is suitably C-shaped as shown to provide a pair of spaced-apart pole pieces 6a, 6b disposed closely adjacent the conduit 3 on opposite sides thereof. Thus when the electromagnet 5 is excited, it provides between the pole pieces 6a and 6b a magnetic field oriented in a direction transversely across the column of conducting liquid contained in that section of the conduit 3 lying in the gap between the pole pieces. Finally the pump P includes a pair of current conducting electrodes 8 and 9 disposed on opposite sides of the conduit 3 within the gap between the magnet pole pieces and along an axis mutually perpendicular to both the direction of the magnetic field and the longitudinal axis of the conduit 3.

The conduit 3 is preferably formed of electrically insulating material, the electrodes 8 and 9 passing through the walls of the conduit into electric contacting engagement with the contained column of conducting liquid. The field winding 7 and the current electrodes 8 and 9 are adapted to be connected to suitable sources of electric current supply for energization of the pump in any desired manner.

It will be understood that when current is passed transversely through the conducting liquid between the electrodes 8 and 9 and the electromagnet field winding 7 is energized, the resulting electromagnetic force will drive, or pump, the liquid 4 along the conduit in a direction depending upon the direction of current flow through the liquid and in the field winding. As will hereinafter be evident from FIG. 2, these directions of current flow are so selected that liquid is pumped from the mercury reservoir toward the discharge chamber. The rate of liquid flow is proportional to the currents passed through the liquid and through the magnetic winding. Accordingly the volume or quantity of liquid pumped past any predetermined point in an incremental interval of time $dt$ is proportional to the product of current, field strength and time, and is thus a function of current integrated over a desired interval.

Referring now to FIG. 2, we have illustrated schematically a mercury pump of the type shown at FIG. 1 connected for energization by the arcing current between contact members 1 and 2 of an electric circuit interrupting device CB and having its mercury conduit 3 connected at one end to a mercury supply reservoir 12 and at the other end to a discharge chamber 13.

The circuit breaker interrupting device CB of FIG. 2 is shown as the device of the vacuum type having a pair of separable contact rods 1 and 2 relatively movably mounted and partially enclosed within a sealed envelope 14. While the contact rods 1 and 2 are shown in their engaged position, it will be understood that the movable contact rod 2 is slidable longitudinally in a vacuum tight bushing 2a and is biased to open position by means of a tension spring 15. A latch lever 16 pivotally mounted and biased by a spring 17 to latching position is arranged to engage a shoulder 18 at the outer end of the contact rod 2 to maintain the contacts in the engaged position shown. In order to trip the latch 16 and permit the circuit breaker contacts 1 and 2 to open position under the influence of the spring 15, we provide a current responsive tripping relay 19 energized from a current transformer 20. The transformer 20 is coupled to a power current conductor 21 which is connected to one of the circuit breaker contacts.

It will be observed that in the operation of the mercury pump P of FIG. 2 the body of primary liquid, i.e., the mercury 4, is free to move in either direction through the conduit 3 so that in the deenergized position of the pump shown in the drawing the mercury assumes a predetermined initial level in the discharge chamber 13 determined by the level of mercury in the mercury reservoir 12. This initial level is intermediate the top and bottom of the discharge chamber so that mercury only partially fills the chamber. Whenever the pump is energized an additional incremental quantity of mercury is driven through the conduit 3 and into the discharge chamber 13 in an amount proportional to the product of the quadrature energizing quantities and time. The mercury level in the discharge chamber 13 rises accordingly to a higher level indicative of this pumped liquid volume. Upon deenergization of the pump the body of mercury resets to its initial position as shown in the drawing. The body of mercury 4 thus moves to and fro in the conduit 3 in undulating flow, the mercury level in the discharge chamber rising intermittently whenever the pump is energized.

In order to integrate over an extended period of time the incremental volumes of mercury pumped in a forward direction toward the discharge chamber during intermittent intervals of pump energization, we provide a secondary overflow liquid 30 having low surface tension and a density less than that of the primary liquid. The liquid 30 completely fills the discharge chamber 13 above the mercury surface and is adapted to be displaced from the chamber in measured quantity through a capillary overflow tube 13a. The tube 13a is disposed at the top of the discharge chamber 13 and has a vertical leg extending above the chamber. To provide for makeup of the secondary liquid 30 so that the discharge chamber 13 will remain filled when the primary liquid resets, we provide a make-up reservoir 31 connected to the discharge chamber 13 substantially above the normal level of mercury and arranged to provide a secondary liquid level normally within the vertical leg of the discharge tube 13a. The reservoir 31 and the discharge chamber 13 are filled with secondary liquid 30 initially to the top of the discharge tube 13a. As secondary liquid is displaced from the system during pumping intervals the common level in the reservoir 31 and capillary tube 13a falls slightly. However, because of the relatively large capacity of the reservoir 31 and the very small diameter of the capillary discharge tube 13a, the error resulting from incomplete filling of the capillary tube is very slight.

Secondary liquid 30 displaced from the discharge chamber 13 during pumping intervals is irreversibly discharged through a drain conduit 34 into a calibrated accumulating vessel or gauge 33. In this manner the incremental volumes of secondary liquid displaced during intermittent pumping intervals are integrated over an extended time period. To ensure accuracy it is necessary that equal pressure be maintained on the liquids in the gauge 33 and the reservoirs 12 and 31. For this purpose a pair of vent opening openings 36 and 37 are provided to interconnect the spaces above the liquid surfaces in these vessels.

In order that the secondary liquid 30 displaced from the discharge chamber 13 during any pumping interval may not be improperly driven into the make-up reservoir 31, we provide means to block or constrict reverse flow of the secondary liquid into the reservoir 31. By way of illustration we have shown a check-valve 32 interposed between the reservoir 31 and the discharge chamber 13 and operable to close off access to the reservoir 31 whenever pressure is applied to the secondary liquid 30 by upward displacement of mercury in the discharge chamber 13. It will be understood by those skilled in the art that if available liquid reset times are sufficiently long in relation to the pumping or discharge intervals, leakage flow from the discharge chamber 13 into the reservoir 31 may be sufficiently inhibited by means of a constricted passage-way therebetween.

At FIG. 2 we have shown also another suitable means for preventing improper flow of secondary liquid 30 into the reservoir 31 during pumping intervals. For this purpose we provide an inductor tube 13b set into the side walls of the discharge chamber 13 above the mercury surface and having an outlet of small diameter adjacent the discharge tube 13a. The velocity effect of liquid flowing through the inductor tube 13b reduces pressure adjacent its outlet and by proper proportioning can be made to cancel out the tendency of driving pressure to move secondary liquid into the reservoir 31. The inductor tube 13b and the check valve 32 may each be used separately or in combination.

It will now be evident to those skilled in the art that in the operation of the arc current integrating device shown at FIG. 2, no electromagnetic pumping action takes place so long as the circuit breaker contacts 1 and 2 remain in engaged position. In this position there is no appreciable voltage applied to the field winding 7 of the pump P and the current passed transversely through the mercury column in the conduit 3 from the electrodes 8 and 9 is ineffective in itself to cause pumping action. In this condition the mercury body 4 assumes a predetermined initial position of rest wherein the mercury level in the discharge chamber 13 is slightly below that in the mercury reservoir 12 as determined by the weight of secondary liquid 30 in the discharge chamber 13. In the event that excessive current through the circuit breaker CB causes operation of the tripping relay 19, the latch 16 is released and the movable contact 2 of the circuit breaker moves to disengaged position under the influence of the opening spring 15. In the event that no arc is drawn between the contacts 1 and 2, full line voltage is applied to the field winding 7 of the electromagnetic pump P, but no pumping action takes place because the current transformer 20 ceases to supply current through the mercury between the electrodes 8 and 9.

If however, an arc is drawn between the circuit breaker contacts 1 and 2 when they are separated, the arc voltage is applied to the field winding 7 of the electromagnetic pump P, and current continues to be supplied transversely across the mercury from the current transformer 20. With this quadrature energization pumping action takes place so long as an arc in the circuit breaker continues to exist. During this brief interval mercury is driven by the pump from the reservoir 12 into the discharge chamber 13 at a rate dependent upon the product of the magnitudes of arc current and arc voltage. Accordingly there is driven into the discharge chamber 13 during the arcing interval a volume of mercury proportional to the product of arcing time and flow rate. Since arcing voltage is substantially constant the incremental volume of mercury driven into the discharge chamber 13 is in this case substantially proportional to the product of arc time and arc current.

The incremental volume of mercury pumped into the discharge chamber 13 displaces from the chamber a like quantity of secondary liquid 30. This liquid, being unable to flow into the make-up reservoir 31 because of the check valve 32 and inductor tube 13b, is irreversibly displaced through the capillary discharge tube 13a and into the accumulating gauge 33.

It will be evident that repeated operations such as that described above result in the accumulation in the gauge 33 of a total volume of displaced secondary fluid which is representative of the arcing duty on the circuit breaker CB over some predetermined time period. By providing a relatively large make-up reservoir 31, this integrating period may be quite long before the level of secondary fluid in the discharge tube 13a gets below the bottom of the discharge tube. When secondary liquid has been discharged into the accumulating vessel 33 to this extent, the entire device should be reset by returning the liquid from the vessel 33 through the drain conduit 34 and a vent opening 36 to the make-up reservoir 31.

It will now be evident to those skilled in the art that provision of the secondary liquid make-up reservoir 31 renders our improved liquid flow integrator equally useful whether the flow of primary liquid be unidirectional in step-by-step fashion or undulating, i.e., resetting, in the manner shown in the illustrated embodiment.

While we have described a preferred embodiment of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. Hydraulic integrating apparatus comprising:
   (a) a source of primary liquid supply having a free surface,
   (b) a discharge chamber separate from said source,
   (c) a conduit interconnecting said source and said discharge chamber and containing primary liquid,
   (d) a body of primary liquid contained in said discharge chamber and partially filling said discharge chamber,
   (e) said discharge chamber having an overflow opening at the top thereof,
   (f) a secondary liquid filling said discharge chamber above the level of said body of primary liquid and having a free surface in gaseous communication with the free surface of said source,
   (g) said body of primary liquid in said discharge chamber physically separating the primary liquid in said conduit from the secondary liquid above said body of primary liquid,
   (h) secondary liquid accumulating means communicating with said overflow opening,
   (i) a make-up source of secondary liquid supply connected to said discharge chamber upstream from said overflow opening,
   (j) means for restricting reverse flow of secondary liquid from said discharge chamber to said secondary supply source, and
   (k) means for driving additional primary liquid from said primary liquid supply source through said conduit into said discharge chamber and for thereby raising the level of said primary liquid in said discharge chamber, thus displacing from said discharge chamber a corresponding amount of secondary liquid into said accumulating means.

2. The hydraulic integrating apparatus of claim 1 in which means is provided for intermittently energizing said driving means to move said primary liquid through said conduit into said discharge chamber in incremental quantities thereby intermittently raising the level of the primary liquid in said discharge chamber and displacing from said discharge chamber incremental quantities of said secondary liquid into said accumulating means.

3. Hydraulic integrating apparatus comprising:
   (a) a conduit, a discharge chamber at one end of said conduit, and a primary liquid source at the opposite end of said conduit,
   (b) said discharge chamber being provided with a capillary overflow tube having a vertical leg extending beyond the top of said chamber,
   (c) a primary liquid of high density contained in said conduit and partially filling said discharge chamber to a predetermined intermediate level,
   (d) a secondary liquid of low density and low surface tension compared to said primary liquid substantially filling said discharge chamber and said overflow tube above the level of said primary liquid,
   (e) said secondary liquid and said primary liquid source having free surfaces in gaseous communication with each other,
   (f) said primary liquid in said discharge chamber physically separating the primary liquid in said conduit from the secondary liquid above said primary liquid in the discharge chamber,
   (g) a secondary liquid supply reservoir connected to said discharge chamber at an intermediate point above the level of said primary liquid,
   (h) restrictive flow control means between said reservoir and discharge chamber,
   (i) an accumulating vessel connected to receive secondary liquid discharged from said overflow tube,
   (j) and driving means adapted for intermittent energization to move incremental quantities of said primary liquid through said conduit and into said discharge chamber thereby intermittently to raise the level of primary liquid in said chamber and to displace from said discharge chamber corresponding incremental quantities of said secondary liquid into said accumulating vessel.

4. The hydraulic integrating apparatus of claim 3 in which said flow control means comprises a unidirectional valve that permits flow from said reservoir to said discharge chamber but substantially blocks flow in a reverse direction.

5. The hydraulic integrating apparatus of claim 3 in which said primary liquid is free to move to and fro in said conduit, said primary liquid returning to its initial position between pumping intervals thereby refilling said discharge chamber with secondary liquid from said reservoir.

6. The hydraulic integrating apparatus of claim 3 in which said driving means comprises an electromagnetic pump and means for intermittently energizing said pump, and in which said primary liquid is an electrically conducting liquid.

References Cited

UNITED STATES PATENTS

| | | | |
|---|---|---|---|
| 330,451 | 11/1885 | Weston | 324—93 |
| 663,461 | 12/1900 | Oxley | 324—93 |
| 1,736,643 | 11/1929 | Beck | 103—1 |
| 2,978,985 | 4/1961 | Lindenblad | 103—1 |
| 3,161,822 | 12/1964 | Streater | 324—28 |

WALTER L. CARLSON, *Primary Examiner.*

RUDOLPH V. ROLINEC, *Assistant Examiner.*